United States Patent Office 3,489,621
Patented Jan. 13, 1970

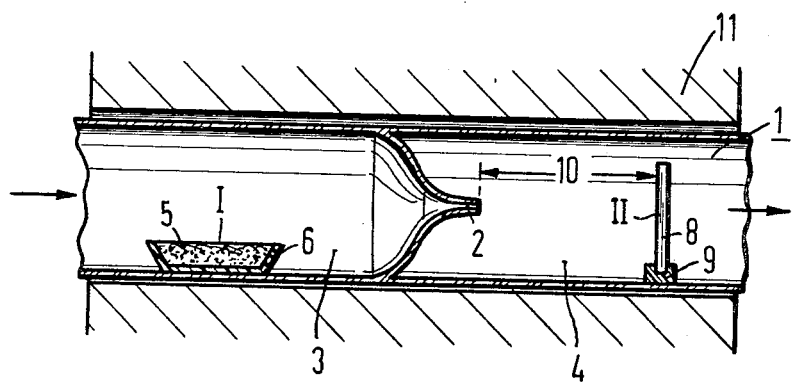

3,489,621
METHOD OF PRODUCING HIGHLY PURE CRYSTALLINE, ESPECIALLY MONOCRYSTALLINE MATERIALS
Erhard Sirtl, Munich, Germany, assignor to Siemens Aktiengesellschaft, a corporation of Germany
Filed May 24, 1967, Ser. No. 640,879
Claims priority, application Germany, June 2, 1966, S 104,115
Int. Cl. H01l 7/36, 7/44; B01j 17/30
U.S. Cl. 148—175                                11 Claims

ABSTRACT OF THE DISCLOSURE

Disclosed is a method of producing highly pure, crystalline, particularly monocrystalline, material and preferably semiconductor material, by a chemical transport reaction. To this end, material located in a solid form in a reaction vessel is converted, under the influence of a reaction gas, into a gaseous compound and is precipitated in a crystalline, preferably monocrystalline, form at another location of the reaction vessel, while the compound dissociates. The present method is characterized by the fact that two bottom bodies I and II, arranged at some distance and serving as source and substrate, respectively, are uniformly heated and maintained at virtually equal temperatures. A dynamic pressure drop is adjusted between the two bottom bodies thus to achieve a material transport effected between the bottom bodies I and II, the pressure drop being at least 20 torr.

---

The present invention relates to a method of producing highly pure, crystalline, especially monocrystalline, materials, preferably semiconductor materials, by a chemical transport reaction, whereby material contained in solid form inside a reaction vessel is transformed into a gaseous compound by the action of a reaction gas and precipitated at another location of the reaction vessel in crystalline and preferably monocrystalline form by dissociation of the compound.

In known transport reaction methods for producing highly pure materials, the solid material is usually subjected at elevated temperatures to the action of a reaction gas and thereby transformed or converted into a gaseous phase. The resulting gaseous compound migrates in the temperature gradient, according to the type of equilibrium, to a point of higher or lower temperature and there dissociates, precipitating pure material which was previously transformed into a gaseous phase. The precipitation takes place either at a vessel wall or upon a substrate provided therefor. This method is suitable for the purification of original materials having a low degree of purity. Since various materials have different transport properties, they are transported in various ways. This method may also be successfully employed for the production of monocrystals, by using a monocrystalline substrate and by choosing an appropriate precipitation temperature to produce additional monocrystalline growth upon the substrate surface.

In previously used techniques, the transport was achieved in different ways, for example by a long path within a tubular vessel or by placing two surfaces adjacent each other with a slight distance therebetween and utilizing the temperature gradient prevailing between said surfaces.

I have ascertained that many transportation processes are pressure sensitive and that the transport reaction may also be effected by arranging two bottom bodies I and II at some distance from one another within a reaction vessel and, respectively, serving as the source and the substrate, uniformly heating and maintaining said bodies at substantially equal temperatures, adjusting a dynamic pressure drop between the two bottom bodies and effecting a material transport between the bottom bodies I and II in accordance with the adjustment of the critical pressure between the bottom bodies I and II, so that material is removed from bottom body I and precipitated upon bottom body II.

Compared to previously used methods, my above-described method has the advantage of obtaining relatively large yields, since high precipitation velocities are obtainable by adjusting the flow rates, and also a preferred precipitation upon the carrier body may be produced by suitably directing the gas. This eliminates the disadvantages connected with the known methods. These disadvantages are a low precipitation rate together with a low transport efficiency.

In accordance with the method of the present invention, it is preferable to employ pulverized material for the source. The substrate used may be a monocrystalline body of the same material as the source. This is preferred for the production of monocrystalline bodies, although the doping of source and substrate may differ.

It is also possible to use different materials for the source and the substrate. Thus, semiconductor material may be used for the source, while an inert material, for example quartz or ceramic, may be used for the substrate. The latter may also be comprised of a metal disc.

The primary reaction gases to be used are halogen- or halide-containing gas mixtures. The carrier gas may be hydrogen, nitrogen or argon.

In order to effect an adequate material transport between the bottom bodies I and II, which are, respectively, the source and the substrate, a pressure drop of at least approximately 20 torr must be established. The pressure drop may be effected in a tubular reaction vessel, by a strong necking down of the tube diameter or through the installation of flow resistances. To amplify the pressure drop, baffle members may also be installed in the reaction vessel.

More specific details of the present invention will be derived on hand of an embodiment, described in the figures.

The single figure shows, in section, a tubular reaction vessel 1, which is suitable for carrying out the present invention. The reaction vessel 1 is subdivided into chambers 3 and 4 by means of a nozzle-type constriction (Venturi). Reaction gas is passed through in the direction of the arrow. The Venturi 2, which may be substituted by a flow resistance or the like, produces a pressure drop within the tubular vessel 1. In the arrangement shown in the figure, this results in a gas accumulation in chamber 3, while a lower pressure is established in chamber 4, i.e. the pressure $p_1$ in chamber 3 is greater than the pressure $p_2$ in chamber 4. The bottom body I, serving as the source, is placed in chamber 3. In the present illustration, the bottom body I is of pulverulent or granulated original material 5 and is within boat 6 of inert material. Chamber 4 contains the bottom body II, for example a carrier crystal 8, which serves as the substrate. This carrier crystal is preferably positioned prependicularly to the flow direction, by means of a holder 9. The distance 10 between the nozzle-like constriction 2 and the carrier crystal 8 must be so selected that a sufficient pressure drop of the gas, entering at 2, is obtained.

For example, in the system Si-I, at a reaction temperature of 1150–1250° C. and, for example, 1200° C., a pressure drop from $p_1 = 100$ torr to $p_2 = 20$ torr is adjusted. To effect the reaction, the portion of the reaction vessel 1, of about 3 cm. diameter, illustrated in the figure is located in a tubular furnace 11 which is so formed that both bottom bodies I and II are uniformly heated to the same temperature. The uniform temperature may be obtained by uniform heater windings. A reaction takes place in chamber 3, between the silicon in boat 6 and the iodine which flows thereover and which is preferably introduced into the reaction vessel with hydrogen as a carrier gas to form silicon iodide. The silicon-iodide flows, with the gas current, through nozzle 2 into the chamber 4. Nozzle 2 results in a pressure drop from $p_1=100$ torr to approximately $p_2=20$ torr in chamber 4. The distance 10 is about 6 cm. Silicon in the form of its gaseous iodide is transported by the pressure drop to the carrier crystal 8 which also comprises monocrystalline silicon, and there precipitates by dissociation of the iodide to form a monocrystalline growth layer. The execution of a transport reaction under isothermal conditions, in a pressure drop, has the advantages that first higher precipitation rates may be obtained and, secondly, a planned precipitation may be produced upon the carrier crystal, through an appropriate arrangement of said crystal within the reaction chamber.

The method of our invention is not limited to silicon or other semiconductor materials only, but is equally suitable for many other transport systems. This includes, for example, Ge-I, Ti-I, Zr-Cl, Zr-Br, Zr-I, V-I, Nb-Cl, Nb-Br, Ta-Cl, Ta-Br and $Cu_2O$-HCl.

In the Ti-I system, for example, a temperature range of 1200–1350° C. was found favorable for effecting the reaction. In the latter instance, a pressure gradient of $p_1=50$ torr to $p_2=4$ torr, is established. Precipitation of titanium results, e.g., in a fine-crystalline form on an appropriately selected carrier body.

The selection of reaction temperatures, the distance 10 and the values $p_1$ and $p_2$ depend on the system being employed and may be arrived at by using table values such as found at IANAF "Thermodynamical Tables" Dow Chemical Company, Midland, Mich., U.S.A.

I claim:
1. In a method of producing highly pure, crystalline material by a chemical transport reaction, which comprises locating a source in solid form in a reaction vessel so it may be converted, under the influence of a reaction gas, into a gaseous compound and precipitated in a crystalline form upon a substrate at another location of the reaction vessel by dissociation of the compound, the improvement which comprises arranging said source and said substrate at some distance from each other within said reaction vessel, uniformly heating and maintaining said source and said substrate at substantially equal temperatures and adjusting the dynamic pressure drop between said source and substrate to effect a mterial transport from said source to said substrate, said pressure drop being at least 20 torr.

2. The method of claim 1, wherein pulverulent material is used as the source.

3. The method of claim 1, wherein the substrate is a monocrystalline body of the same material as the source.

4. The method of claim 3, wherein the source is of one doping and the substrate is of a second doping.

5. The method of claim 1, wherein the source is comprised of semiconductor material and the substrate is an inert carrier material.

6. The method of claim 5, wherein the carrier is metal.

7. The method of claim 1, wherein the reaction gas contains halogen.

8. The method of claim 1, wherein a carrier gas is added to the reaction gas.

9. The method of claim 1, wherein the pressure drop is produced in a tubular reaction vessel by a strong decrease in the tube diameter.

10. The method of claim 1, wherein the pressure drop is produced by flow resistances.

11. The method of claim 1, wherein the pressure drop is amplified by a baffle member.

References Cited

UNITED STATES PATENTS 3,145,125   8/1964   Lyons _____ 117—106

L. DEWAYNE RUTLEDGE, Primary Examiner

R. A. LESTER, Assistant Examiner

U.S. Cl. X.R.

117—106, 107, 107.2